United States Patent [19]

Miele

[11] Patent Number: 5,004,334
[45] Date of Patent: Apr. 2, 1991

[54] AUXILIARY NOSEPIECE FOR EYEGLASSES

[76] Inventor: Nadine Miele, 2725 W. El Alba Way, Chandler, Ariz. 85224

[21] Appl. No.: 528,539

[22] Filed: May 25, 1990

[51] Int. Cl.$^5$ .............................................. G02C 7/06
[52] U.S. Cl. ...................................... 351/54; 351/41; 351/52; 351/136; 351/138
[58] Field of Search ........................ 351/41, 51, 52, 54, 351/55, 61, 94, 128, 130, 131, 132, 136, 138, 87, 88, 137; D16/113, 123, 126

[56] References Cited

U.S. PATENT DOCUMENTS 2,285,615  6/1942  Ruchser .............................. 351/54
3,773,407  11/1973  Stoner ................................. 351/41

Primary Examiner—Rodney B. Bovernick
Attorney, Agent, or Firm—H. Jay Spiegel

[57] ABSTRACT

An auxiliary nosepiece for eyeglasses is disclosed which is designed to be mountable on a pair of eyeglasses at the location of the existing nosepiece thereof. The auxiliary nosepiece of the present invention is designed to allow the user to wear a pair of eyeglasses upside down. The invention is useful in conjunction with half glasses and bifocals to allow the user to look through the close magnifying portion of the eyeglasses without having to look downwardly to do so.

6 Claims, 2 Drawing Sheets

FIG. 3
FIG. 4
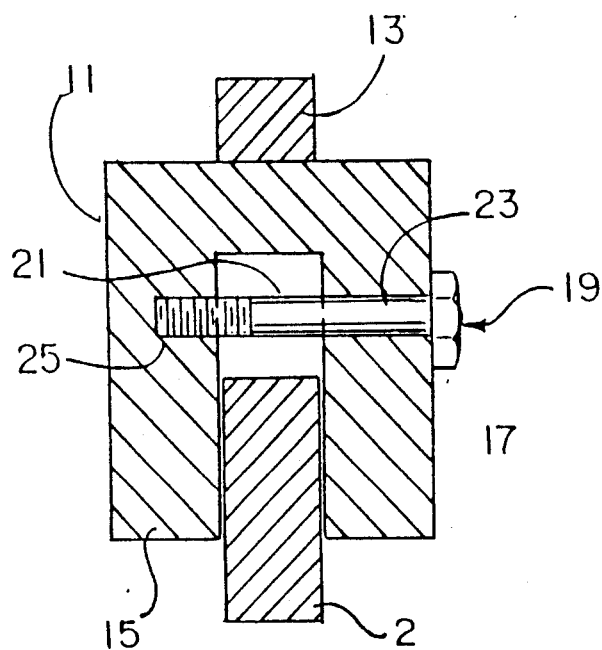
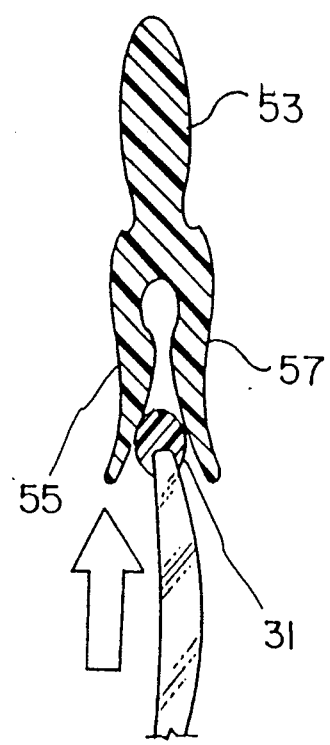
FIG. 5

AUXILIARY NOSEPIECE FOR EYEGLASSES

BACKGROUND OF THE INVENTION

The present invention relates to an auxiliary nosepiece for eyeglasses. In the prior art, accessories designed to be attached to eyeglasses at the location of the existing nosepiece are known. U.S. Pat. No. 2,842,029 to Roth teaches an attachment for spectacles attached at the nosepiece location thereof allowing adjustment of the relative heights of a pair of eyeglasses and an auxiliary frame. However, Roth does not teach structure designed to allow supporting of eyeglasses upside down.

Furthermore, devices associated with eyeglass frames designed to allow pivoting of lenses with respect to the frame are known in the prior art. U.S. Pat. Nos. 3,252,747 to Robins and 4,740,069 to Baum teach this concept. However, again, these patents fail to teach an auxiliary nosepiece designed to allow support of eyeglasses upside down.

SUMMARY OF THE INVENTION

The present invention relates to an auxiliary nosepiece for eyeglasses. The present invention includes the following interrelated aspects and features:

(A) In a first aspect, the inventive auxiliary nosepiece includes mounting structure designed to mount the auxiliary nosepiece over the existing eyeglass frame in the region of the eyeglass frame nosepiece. Two embodiments of this mounting structure are disclosed, one employing structure allowing snapping of the auxiliary nosepiece in mounted position and the other requiring tightening of a screw.

(B) Each embodiment of the auxiliary nosepiece includes a nose engaging portion opening in a direction opposite to the direction of opening of the nosepiece of the existing eyeglass frame.

(C) With the inventive auxiliary nosepiece mounted on an existing pair of eyeglasses, the eyeglasses may be supported on the nose of the user upside down with the temples thereof balanced on the tops of the ears upside down. In this configuration, in the case of bifocals, the user may view through the close-up viewing portion of the lenses thereof without having to look down. In the case of half glasses, the lenses are aligned with the eyes looking straight out rather than looking down.

As such, it is a first object of the present invention to provide an auxiliary nosepiece for eyeglasses.

It is a further object of the present invention to provide such a device designed to allow support of an existing pair of eyeglasses upside down.

It is a still further object of the present invention to provide such a device allowing viewing through the close-up magnifying portions of lenses of a pair of eyeglasses without having to look downwardly.

These and other objects, aspects and features of the present invention will be better understood from the following detailed description of the preferred embodiments when read in conjunction with the appended drawing figures.

BRIEF DESCRIPTION OF THE DRAWINGS

FIG. 3 shows a cross-sectional view along the line III—III of FIG. 1.

FIG. 4 shows a cross-sectional view along the line IV—IV of FIG. 2.

FIG. 5 shows a side perspective view of the combination illustrated in FIG. 1 as worn by a user.

SPECIFIC DESCRIPTION OF THE PREFERRED EMBODIMENTS

Figure 1:
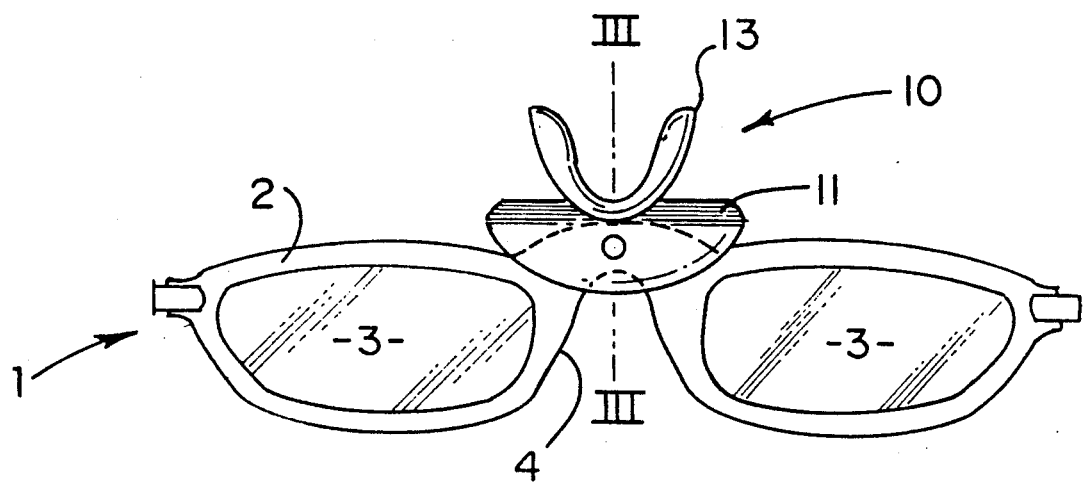
FIG. 1 shows a front view of a pair of half glasses having an embodiment of the inventive auxiliary nosepiece mounted thereon.

With reference, first, to FIGS. 1, 3 and 5, a pair of half glasses is generally designated by the reference numeral 1 and is seen to include a frame 2 having lenses 3, a nosepiece 4 and temples 5 of which one is shown in FIG. 5.

At the area of the nosepiece 4, a first embodiment of the present invention is mounted and is generally designated by the reference numeral 10. The inventive device 10 is seen to include a mounting structure 11 and a nosepiece 13.

With reference to FIG. 3, the mounting structure 11 is made of a U-shaped cross-section having downwardly depending legs 15, 17 which engage on front and rear surfaces of the frame 2.

A screw 19 having a threaded shaft 21 extends through a smooth bore 23 in the leg 17 and is threadably received in a threaded bore 25 in the leg 15. Thus, tightening of the screw 19 in the threaded bore 25 will cause a clamping action of the legs 15 and 17 to retain the inventive auxiliary nosepiece 10 in mounted position as shown in the figures.

With reference to FIG. 5, the manner of use of the inventive auxiliary nosepiece 10 is shown and of particular note is the temple 5 having its ear engaging portion 6 facing upwardly and away from the ear 7. However, the end of the temple 5 adjacent the ear engaging portion 6 is sufficiently long enough to allow balancing of the temple on the upper portion of the ear 7.

In the position shown in FIG. 5, it is clear that the user may view through the lenses 3 of the half glasses 1 while looking straight ahead whereas with the half glasses 1 worn in their usual configuration, the user would have to look downwardly to see therethrough.

Figure 2:
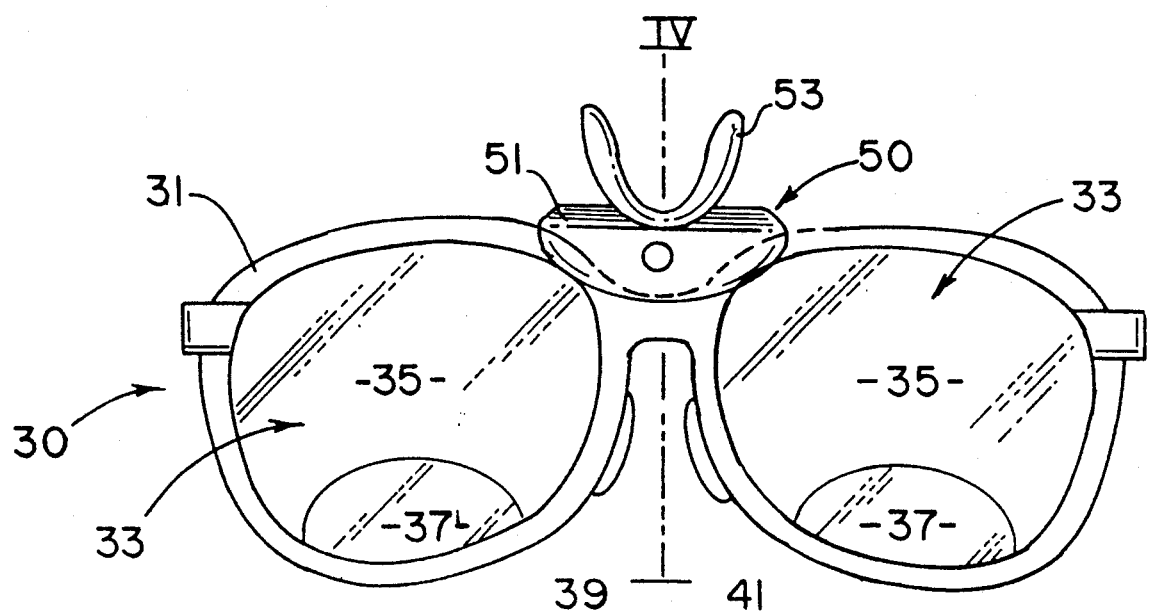
FIG. 2 shows a pair of bifocals having a further embodiment of the inventive auxiliary nosepiece mounted thereon.

With reference, now, to FIGS. 2 and 4, a pair of bifocals is generally designated by the reference numeral 30 and is seen to include a frame 31 having lenses 33 mounted therein, which lenses include a first region 35 having a first degree of magnification and a second region 37 having a second degree of magnification. The bifocals 30 also include a nosepiece 39 including, in the embodiment shown, nose engaging structures 41.

A second embodiment of the auxiliary nosepiece is generally designated by the reference numeral 50 and is seen to include mounting structure 51 and a nosepiece 53. With reference to FIG. 4, the nosepiece 53 is made of a resilient material including depending legs 55, 57 designed to resiliently spread apart when forced over the frame 31 to snap thereover to maintain the inventive auxiliary nosepiece 50 in mounted position thereover.

The use of the auxiliary nosepiece 50 is identical to the use of the auxiliary nosepiece 10. With the auxiliary nosepiece 50 mounted on a pair of bifocals 30 as shown, the bifocals may be worn upside down in a manner corresponding to the manner of wearing the half glasses as illustrated in FIG. 5, with the regions 37 of the lenses 33 thereof directly ahead of the eyes of the user rather than downwardly located with respect thereto.

Of course, the present invention is most useful in conjunction with eyeglasses wherein the prescriptions for the lenses are identical. Otherwise, when the eyeglasses are worn upside down, the lenses would be aligned over eyes for which they were not intended.

In the preferred embodiment of the present invention, the nosepiece 13 or 53 as the case may be, may be made of a resilient material having a stiffening member such as a piece of metal embedded therein so that the nosepiece 13 or 53 may be easily adjusted to conform to the shape and configuration of the nose of the user.

In a further aspect, the mounting structure 11 or 51 may be made of any suitable material facilitating mounting and retention of the improved auxiliary nosepiece 10 or 50 on a pair of eyeglasses whether half glasses, bifocals or other type.

As such, an invention has been disclosed in terms of a preferred embodiment thereof which fulfills each and every one of the objects of the invention as set forth hereinabove and provides a new and useful device of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. In a pair of eyeglasses having a frame and a first nosepiece for supporting said eyeglasses on a user's nose, an auxiliary nosepiece comprising mounting structure mounting said auxiliary nosepiece on said frame and a second nosepiece attached to said mounting structure and extending in a direction opposite to a direction of extension of said first nosepiece, whereby said eyeglasses may be supported with said second nosepiece engaging said user's nose in an upside down configuration.

2. The invention of claim 1, wherein said mounting structure includes resilient legs retaining said auxiliary nosepiece on said frame.

3. The invention of claim 1, wherein said mounting structure includes clamping means including a screw which may be tightened to retain said auxiliary nosepiece on said frame.

4. An auxiliary nosepiece comprising a nose engaging device and mounting structure means for mounting said auxiliary nosepiece on a pair of eyeglasses with said nose engaging device extending in a direction opposite to a direction of extension of a nosepiece of said pair of eyeglasses.

5. The invention of claim 4, wherein said mounting structure means includes resilient legs retaining said auxiliary nosepiece on said pair of eyeglasses.

6. The invention of claim 4, wherein said mounting structure means includes clamping means including a screw which may be tightened to retain said auxiliary nosepiece on said pair of eyeglasses.

* * * * *